(12) United States Patent
Sethu et al.

(10) Patent No.: US 10,897,658 B1
(45) Date of Patent: Jan. 19, 2021

(54) TECHNIQUES FOR ANNOTATING MEDIA CONTENT

(71) Applicant: Amazon Technologies, Inc., Seattle, WA (US)

(72) Inventors: Manivel Sethu, Bangalore (IN); Lokesh Amarnath Ravindranathan, Bangalore (IN); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 55 days.

(21) Appl. No.: 16/394,757

(22) Filed: Apr. 25, 2019

(51) Int. Cl.
*H04N 21/81* (2011.01)
*G06K 9/62* (2006.01)
*G06K 9/00* (2006.01)

(52) U.S. Cl.
CPC ...... *H04N 21/8133* (2013.01); *G06K 9/00261* (2013.01); *G06K 9/00744* (2013.01); *G06K 9/6212* (2013.01)

(58) Field of Classification Search
CPC ......... G06T 7/0012; G06T 2207/10116; G06T 2207/30008; G06T 2207/10081; G06T 2207/10088; G06T 2207/10132; G06T 7/60; G16H 15/00; G16H 30/40; G16H 50/30; G16H 30/20; G06K 9/00536; A61B 6/032; A61B 5/1071; A61B 5/1072; A61B 5/4585; A61B 5/7264; A61B 6/505; A61B 5/055; A61B 6/5211
See application file for complete search history.

(56) References Cited

U.S. PATENT DOCUMENTS

| | | | |
|---|---|---|---|
| 10,587,833 B2 * | 3/2020 | Mendeloff | H04N 5/4401 |
| 2017/0091556 A1 * | 3/2017 | Neumann | G06K 9/481 |
| 2017/0323178 A1 * | 11/2017 | Kwatra | G06K 9/6256 |
| 2017/0330600 A1 * | 11/2017 | Aliverti | H04N 9/8205 |

(Continued)

OTHER PUBLICATIONS

Everingham, et al., "Taking the Bite out of Automatic Naming of Characters in TV Video," Image and Vision Computing 27 (2009), Apr. 24, 2008, 15 pages.

(Continued)

*Primary Examiner* — Neil R McLean
(74) *Attorney, Agent, or Firm* — Weaver Austin Villeneuve & Sampson LLP (57) ABSTRACT

Methods and apparatus are described for automating aspects of the annotation of a media presentation. Events are identified that relate to entities associated with the scenes of the media presentation. These events are time coded relative to the media timeline of the media presentation and might represent, for example, the appearance of a particular cast member or playback of a particular music track. The video frames of the media presentation are processed to identify visually similar intervals that may serve as or be used to identify contexts (e.g., scenes) within the media presentation. Relationships between the event data and the visually similar intervals or contexts are used to identify portions of the media presentation during which the occurrence of additional meaningful events is unlikely. This information may be surfaced to a human operator tasked with annotating the content as an indication that part of the media presentation may be skipped.

20 Claims, 5 Drawing Sheets

(56) References Cited

U.S. PATENT DOCUMENTS

2019/0236371 A1* 8/2019 Boonmee ........... G06K 9/00765
2020/0074481 A1* 3/2020 Zhang ................ G06Q 30/0205

OTHER PUBLICATIONS

Haurilet, et al., "Naming TV Characters by Watching and Analyzing Dialogs,". Applications of Computer Vision (2016), 9 pages.
Tapaswi, et al.,"Cleaning up After a Face Tracker: False Positive Removal," IEEE International Conference on Image Processing (ICIP) (2014), 5 pages.
Tapaswi, et al., ""Knock! Knock! Who is it?" Probabilistic Person Identification in TV Series," Conference on Computer Vision and Pattern Recognition (CVPR) (2012), 8 pages.
Zhang, et al. "Character Identification in Feature-Length Films Using Global Face-Name Matching," IEEE Transactions on Multimedia, vol. 11, No. 7, Nov. 2009, 13 pages.

* cited by examiner

TECHNIQUES FOR ANNOTATING MEDIA CONTENT

BACKGROUND

Increasingly, streaming video services are providing interactive features in conjunction with their primary content. For example, Prime Video from Amazon includes a service called X-Ray with many of its video titles in which interactive metadata relating to the title may be accessed via an onscreen UI during playback. Among other features, the X-Ray metadata provide access to information about the cast and soundtrack of the title and, in particular, the actors and the music that are part of the current scene.

Despite the popularity of the X-Ray service, most content creators and providers do not provide enabling information as part of the content itself. Therefore, providing the service has historically required manual annotation of each title by human operators. This involves a human operator watching the title and, for each scene, identifying the first appearance of a cast member, time coding that event, and connecting that event to information about that actor (e.g., a head shot photo and biography from IMDb). This must be done for each scene and each cast member over the course of the title. Similar steps must be taken for anything else being tracked with the service (e.g., music tracks in the title soundtrack).

Given the millions of titles in existence and the introduction of thousands of new titles every week, this approach to annotating media presentations is not scalable.

DETAILED DESCRIPTION

This disclosure describes techniques for automating aspects of the annotation of media presentations to support services such as, for example, Prime Video's X-Ray. Events are identified for a media presentation that relate to entities associated with the scenes of the media presentation. These events are time coded relative to the media timeline of the media presentation and might represent, for example, the appearance of a particular cast member or playback of a particular music track. The video frames of the media presentation are processed to identify visually similar intervals, i.e., portions of the media presentation in which the video frames have similar visual characteristics. These intervals may serve as or be used to identify contexts (e.g., scenes) within the media presentation. Relationships between the event data and the visually similar intervals or contexts are used to identify portions of the media presentation during which the occurrence of additional meaningful events is unlikely. In some cases this information may be surfaced to a human operator tasked with annotating the content as an indication that part of the media presentation may be skipped. An example may be instructive.

Figure 1:
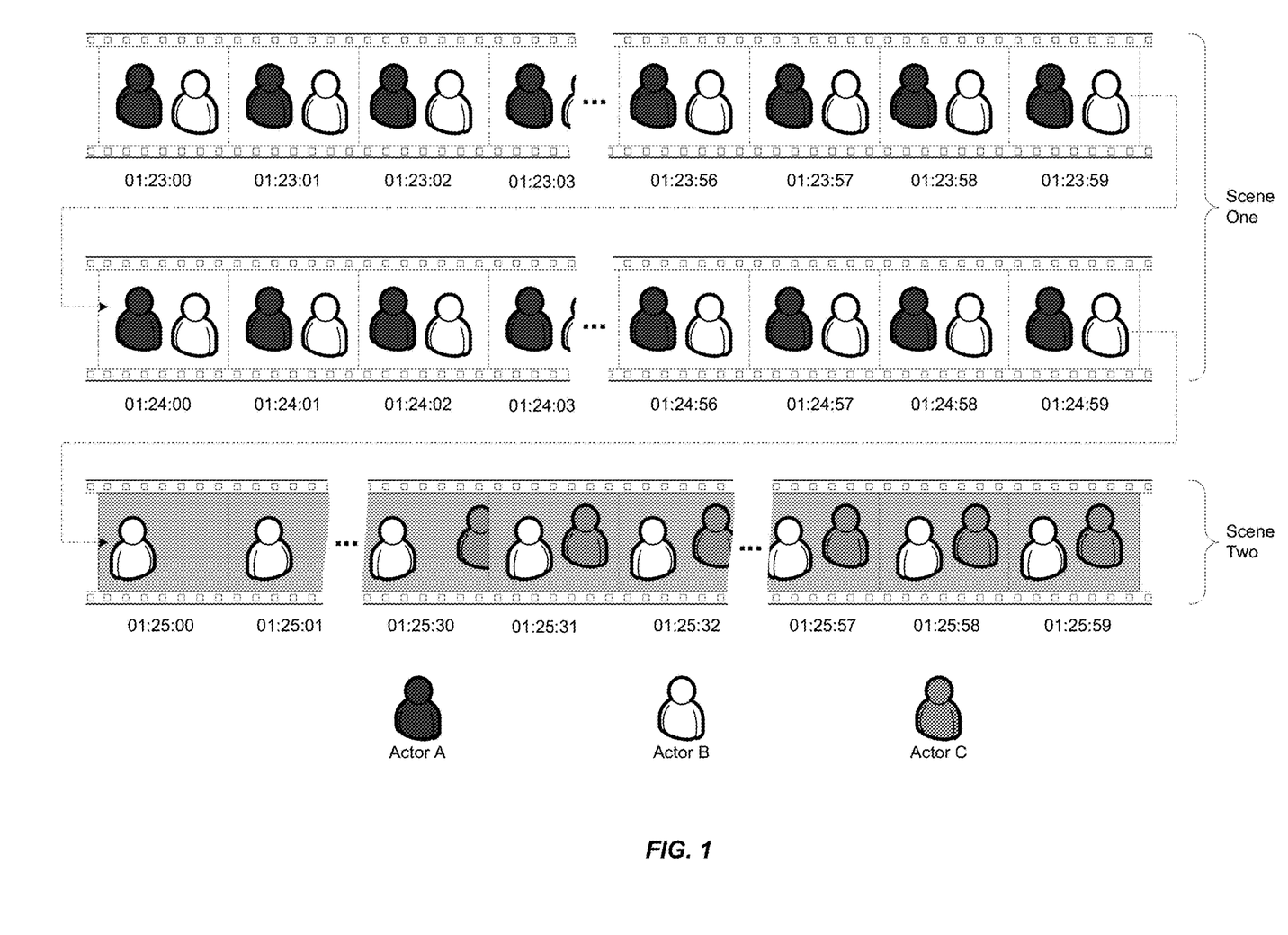
FIG. 1 illustrates an example of a particular class of implementations enabled by the present disclosure.

FIG. 1 shows a sequence of video frames of a video title in which multiple actors appear in multiple scenes. In the depicted example, the frames are labeled as corresponding to one-second intervals for illustrative purposes. However, it will be understood that typical content typically has many frames per second (e.g., 30 or 60). It should also be noted that, while this example only refers to the identification of actors, the scope of the present disclosure is not so limited.

In scene one, which lasts about two minutes (from 1:23:00 to 1:24:59), actors A and B appear in the first frame of the scene and remain in the scene until its conclusion. In scene two, which lasts about one minute (from 1:25:00 to 1:25:59), actor B appears in the first frame of the scene and is the sole actor on the screen until 30 seconds into the scene, at which point actor C enters the scene. Using a conventional approach to annotation, a human operator would need to watch all three minutes of these scenes even though there are only four events relating to the cast that need to be recorded; two events at the beginning of scene one for the appearance of actors A and B, one event at the beginning of scene two for the appearance of actor B, and one event 30 seconds into scene two for the appearance of actor C. This is due to the fact that the human operator does not know in advance whether or not any further meaningful events will occur that require annotation.

According to various implementations enabled by the present disclosure, portions of a media presentation during which meaningful events (e.g., from the perspective of metadata annotation) are unlikely to occur are identified through an understanding of the relationship between event data and visually similar intervals that represent contexts within the media presentation. Using the example depicted in FIG. 1, events representing the appearance of actors A, B, and C are generated through the use of a facial recognition tool on selected frames over the three minutes of the media presentation (e.g., one frame every second). Each of these events is time coded according to its location on the media timeline of the title. In the depicted example, this results in 120 events for actor A, 180 for actor B, and 30 for actor C.

The three minutes of the title are also processed to identify two visually similar intervals which, in this example, include a first interval that corresponds to scene one in which the frames have a bright background, and a second interval that corresponds to scene two in which the frames have a darker background. As will be described, this may be done using histograms to represent individual video frames and determining the similarities between frames based on their respective histograms. As with event generation, only a subset of the frames might be needed for this purpose.

The events that correspond to each of the intervals are then analyzed to determine whether any part of that interval can be considered "uneventful," i.e., the interval does not or is unlikely to include any meaningful events beyond those already identified. So, for example, in the interval corresponding to scene one, the appearances of both actors A and B are identified by the events generated in the first second of the interval, and the only events generated for the remainder of the interval are redundant of these events. Therefore, after the first second, the remaining 1:59 of the first interval may be considered to be uneventful.

And because the second interval has been determined to be distinct from the first interval, the event representing the appearance of actor B at the beginning of the interval is considered to be meaningful. That is, it is part of a new interval and therefore not redundant of the events for actor B that are associated with the first interval. On the other hand, the only events generated for the next 28 seconds of the second interval are redundant of that first event (because only B is in the scene for that time), with the next meaningful event being the identification of actor C at 30 seconds. Thus, the 28 seconds between the identifications of actors B and C may be considered uneventful. Similarly, the final 29 seconds of the second interval can also be considered uneventful in that actors B and C both remain in the scene and so any additional events representing the appearance of these actors are redundant of the identification of actor B at the beginning of the second interval and the identification of actor C at 30 seconds.

Based on the identification of these uneventful intervals, the annotation system can present notifications and/or options to the human operator annotating the content that corresponding portions of the title can be skipped or displayed using high-speed playback. Depending on the implementation, these portions need not cover the entirety of the uneventful intervals. For example, in order to give the operator sufficient time to review and verify event data, the first several seconds of scene one might be played back before the operator is allowed to skip or fast forward through the title. In another example, if the time between meaningful events within a particular interval is not very long (e.g., less than 10 seconds), the option to skip or initiate high-speed playback might not be enabled. Regardless of how such constraints are implemented, it is clear from this example that the operator would be able to skip much of the three minutes of the title with high confidence that meaningful annotation events will not be missed.

Figure 2:
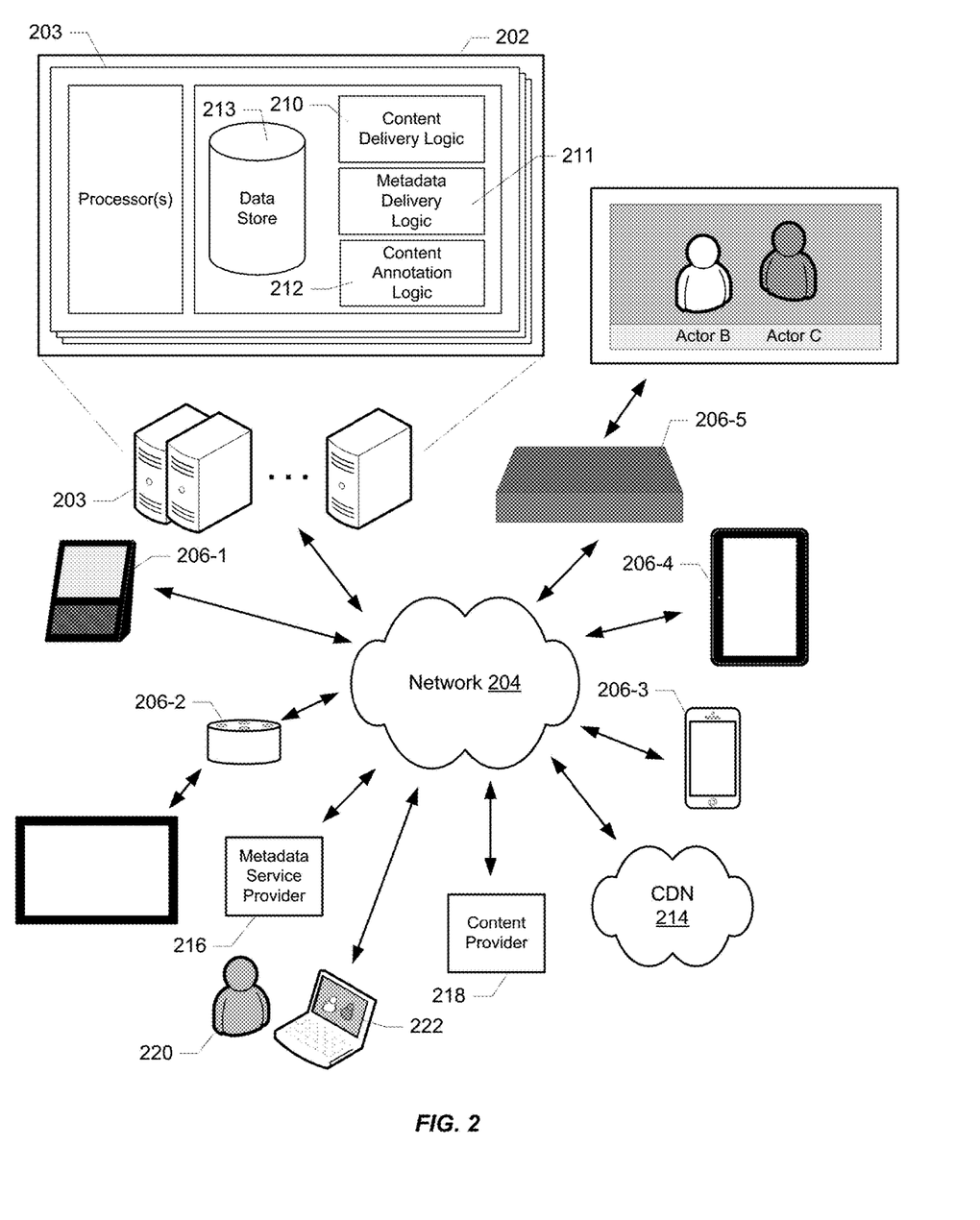
FIG. 2 illustrates an example of a computing environment in which implementations enabled by the present disclosure may be practiced.

FIG. 2 illustrates an example of a computing environment in which a video content service 202 provides video content and interactive metadata via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content and metadata provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with or includes the platform(s) that provides the content and the interactive metadata to client devices, as well as supports the annotation of content as enabled by the present disclosure. However, it will be understood that content service 202 may provide access to content in conjunction with one or more content delivery networks (e.g., CDN 214) that may or may not be independent of content service 202. In addition, the source(s) of one or both of the content and the corresponding metadata may be independent of or integrated to various degrees with content service 202 (e.g., as represented by metadata provider server 216 and content provider 218). Implementations are contemplated in which content may be annotated and metadata for content generated by a service that is integrated with a content service (e.g., 202), by a service associated with the content provider (e.g., 218), or as a third-party service (e.g., 216). The range of variations known to those of skill in the art are contemplated to be within the scope of this disclosure.

In addition to content delivery logic 210 (which facilitates various aspects of content delivery to client devices 206), content service 202 may include metadata delivery logic 211 that facilitates the publication of metadata for consumption by client devices, and content annotation logic 212 that supports the efficient annotation of content with corresponding metadata as enabled by the present disclosure. Content annotation logic 212 might be accessible by a human operator 220 over the network via a content annotation interface 222. Alternatively, interface 222 might access logic associated with a different platform, e.g., metadata service provider 216. Client devices periodically poll a metadata source (e.g., an S3 bucket to which the metadata are published by logic 211) for new metadata generated as described herein.

In addition to providing access to video content, content service 202 may also include a variety of information related to the video content (e.g., video content and associated metadata and manifests in data store 213 to which service 202 provides access). Alternatively, such information associated with and/or about the content, as well as the content itself may be provided and/or hosted by one or more separate platforms, e.g., CDN 214 or remote cloud storage. It should be noted that, while logic 210, 211, and 212, and data store 213 are shown as integrated with content service 202, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 3:
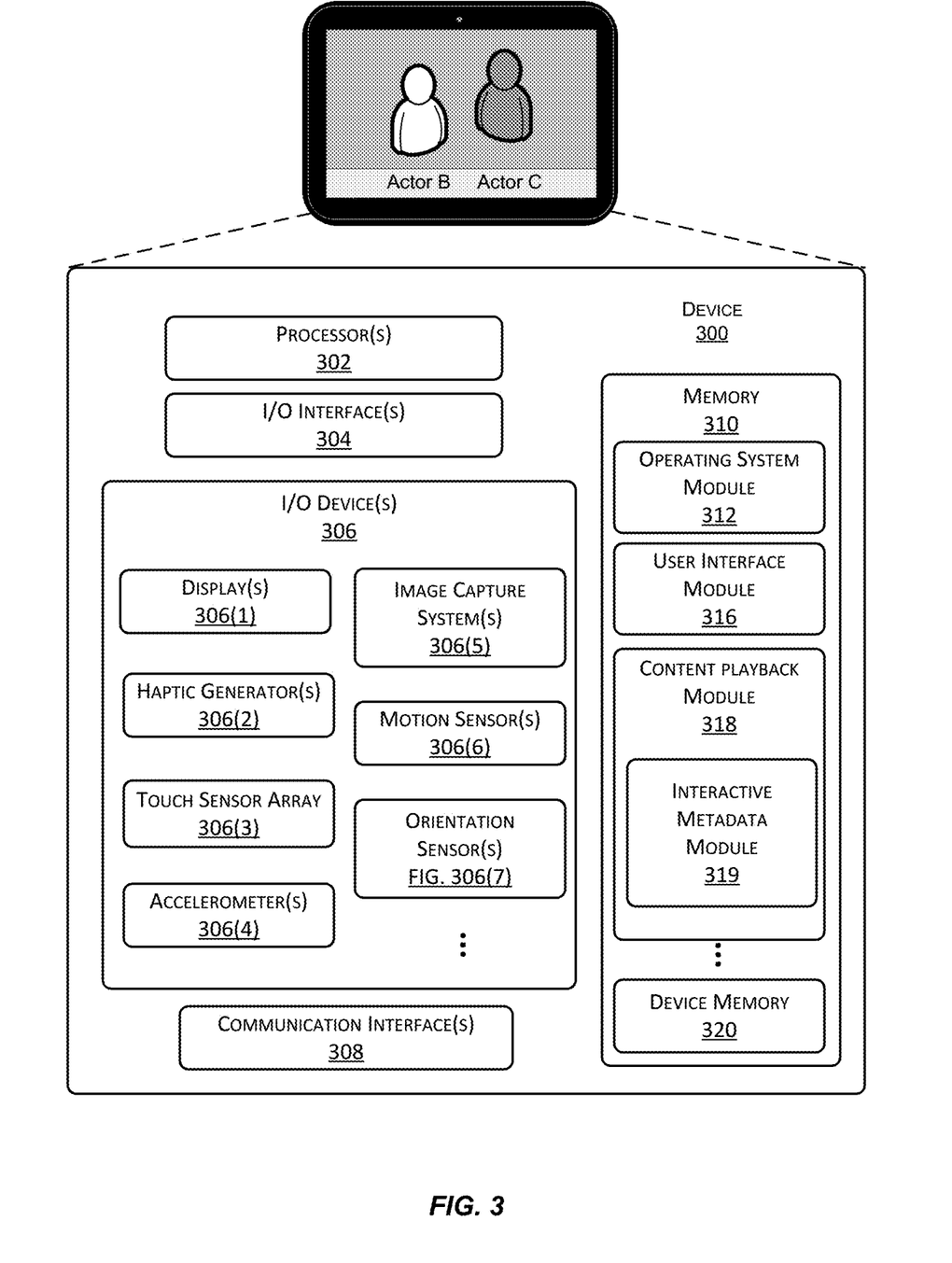
FIG. 3 illustrates an example of a client device with which implementations enabled by the present disclosure may be practiced.

A block diagram of an example of a client device 300 suitable for use with various implementations is shown in FIG. 3. As mentioned above, it should be understood that device 300 may be any of a wide variety of device types.

Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

Client side logic used for acquiring interactive metadata and integrating the metadata with the corresponding video content (represented by interactive metadata module 319) may be implemented in a variety of ways, e.g., in hardware, software, and/or firmware. For example, at least some of this functionality may be implemented as part of the code of a media player operating on device 300 (e.g., content playback module 318). Alternatively, module 319 may be implemented separately from and interact with the device's media player, web browser, mobile app, decoder, etc. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
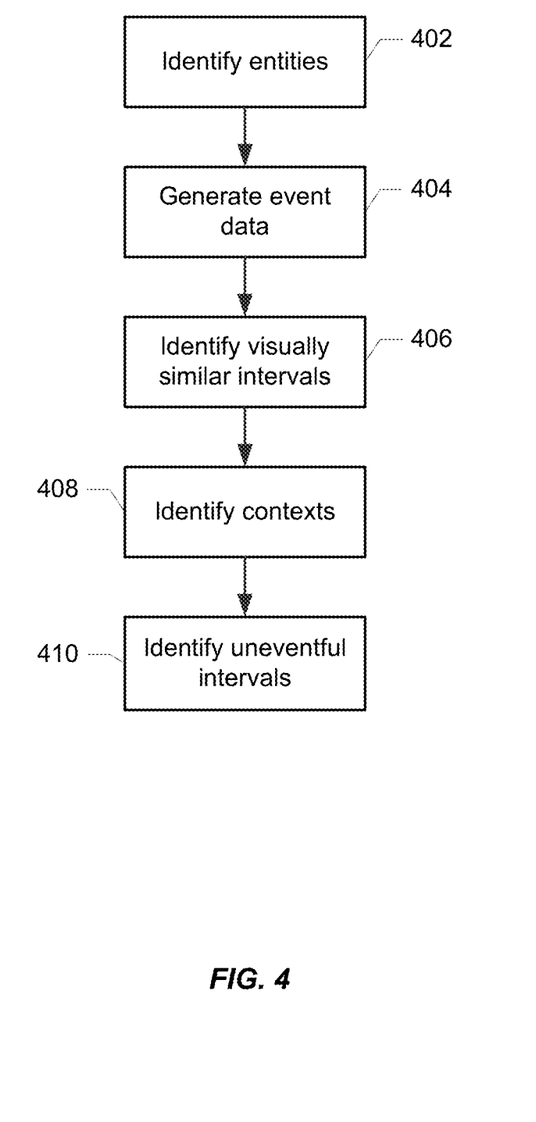
FIG. 4 is a flowchart illustrating operation of a class of implementations enabled by the present disclosure.

The processing of a media presentation (e.g., a video title) to identify uneventful intervals according to a particular implementation is illustrated in the flow chart of FIG. 4. The media presentation is assumed to be a digital video file and may be any of a wide variety of formats. The video frames of the media presentation are processed to identify entities of one or more types (402). As discussed with reference to the example of FIG. 1, one example of such an entity is an actor (e.g., a member of the cast of a movie or television series) who may be identified using, for example, any of a wide variety of facial recognition techniques on individual frames of the presentation. According to one implementation, the AWS Rekognition service from Amazon Web Services is used.

Many other types of entities might also be detected depending on the implementation. For example, music tracks may be identified by processing the audio component of the media presentation. This might involve generating digital signatures from the audio samples by calculating hash values using one or more audio samples associated with spectrogram peaks, resulting in a constellation of temporally localized data points as described, for example, in *An Industrial-Strength Audio Search Algorithm*, Avery Li-Chun Wang, October 2003, the entirety of which is incorporated herein by reference for all purposes. Suitable techniques for generating and comparing digital signatures are also described, for example, in U.S. Pat. No. 6,990,453 entitled System and methods for recognizing sound and music signals in high noise and distortion, and U.S. Pat. No. 7,788,279 entitled System and method for storing and retrieving non-text-based information, the entire disclosures of both of which are incorporated herein by reference for all purposes. A variety of other suitable techniques are known or within the capabilities of those skilled in the art.

Another example is the use of object recognition techniques to identify products or corporate logos. These might be used to generate metadata that provides information about or links to a corporate sponsor of the content. Yet another example is the use of text recognition to identify text in a scene. This might be useful where, for example, the text is in a language different from the primary language of the media presentation, with interactive metadata providing access to a translation of the text. From the diversity of these examples, it should be apparent that there is a wide range of entity types associated with media presentations for which event data may be generated.

Moreover, the portion of a media presentation that is processed to identify entities may vary considerably, and may depend on the type of entity and/or the technique used to recognize that type of entity. For example, according to a particular implementation using AWS Rekognition to identify actors, it was found that sampling the video frames at a rate of one frame per second provided good results in terms of reliably and accurately capturing each actor appearing in a given scene; even where only part of an actor's face was present. However, other facial recognition techniques might be less reliable or efficient and might require more frames to be analyzed. Where the relevant entity is a music track, a range of contiguous samples might be required for detection to be robust, but once detection occurs, some number of samples might be skipped before detection begins again. And because detection of different entity types may involve multiple techniques, entity detection for the different types may be done in separate work flows, either serially or in parallel. Suitable variations on these themes will be apparent to those of skill in the art.

Referring again to FIG. 4, event data are generated that represent each instance of identification of each entity (404). The event data include time stamps for each event that correspond to the point in the media timeline of the media presentation at which the entity was identified. The event data may also include a confidence score representing a level of confidence associated with the identification. In the example of FIG. 1, the event data would include 120 events for actor A time stamped at one-second intervals from 1:23:00 to 1:24:59. For a music track, there might be one event for each point in time at which a match is identified which, depending on the length of the track, might be one or more. For a corporate logo, there might be just one event generated per detection. Again, the number of events may vary depending on the entity type, the technique used for identification, and even the purpose of the corresponding metadata.

The video frames of the media presentation are then processed to identify visually similar intervals (406). This might involve the generation of a data representation (e.g., a histogram) for each frame that represents the visual characteristics of the frame, followed by the filtering of frames that are visually distinct. According to a particular class of implementations, the RGB histograms of the frames are computed and the Bhattacharyya distance (BD) is calculated for the histograms of each pair of frames. The BD is an inverse metric such that two similar frames result in a greater distance. A threshold on the histogram distance is used for filtering the frames that are visually distinct. According to a particular implementation, additional filtering of these the filtered frames is done based on the correlation distance between frames. The correlation distance is a direct metric, i.e., two similar frames result in a lower distance.

According to some implementations, the threshold for histogram distance may be determined for a given application based on experimentation. Implementations are also contemplated in which the threshold may be adaptive.

The Bhattacharyya distance $d_B$ between two frame histograms is defined as:

$$d_B(H_1, H_2) = \sqrt{1 - \frac{1}{\sqrt{\bar{H}_1 \bar{H}_2 N^2}} \sum_I \sqrt{H_1(I) H_2(I)}}$$

in which $H_i$ represents each histogram, I represents intensity values, and N represents the total number of histogram bins.

The correlation distance $d_C$ between two frame histograms is defined as:

$$d_C(H_{f_1}, H_{f_2}) = \frac{\sum_I (H_{f_1}(I) - \bar{H}_{f_1})(H_{f_2}(I) - \bar{H}_{f_2})}{\sqrt{\sum_I (H_{f_1}(I) - \bar{H}_{f_1})^2 \sum_I (H_{f_2}(I) - \bar{H}_{f_2})^2}}$$

where $$\bar{H}_{f_1} = \frac{1}{J} \sum_J H_{f_1}(J)$$

in which $H_{f_i}$ represents each histogram, I represents intensity values, and J represents an instance of I.

The visually similar intervals are used to identify contexts within the media presentation (408). A context corresponds to a contiguous interval of the media presentation that is thematically or conceptually connected (e.g., a scene). According to some implementations, the visually similar interval can be used as a proxy for context. However, there might be situations in which more than one visually similar interval would be a better representation of a context. For example, a conversation between two characters might include several switches of camera angle as each character speaks. If the backgrounds behind the respective characters are very different (e.g., blank interior wall vs. street scene through a restaurant window), several distinct visually similar intervals might be identified even though they all belong to the same scene.

Therefore, according to some implementations, patterns in the visually similar intervals that are indicative of a context are searched for. According to one approach, such a pattern can be detected by identifying similarities between nearby intervals in a sequence of visually similar intervals. For example, where first and second intervals having a high degree of similarity to each other are separated by a third interval having a low degree of similarity with the other two, a pattern representative of a larger context encompassing all three intervals might be identified by determining that the histogram representing a frame near the end of the first interval has a high degree of similarity with the histogram representing a frame near the beginning of the second interval. In this way, the degree of similarity between separated intervals may be leveraged to identify a wide variety of patterns that should be grouped together as a context.

Other information associated with the media presentation might also be useful in identifying contexts that include multiple consecutive intervals that otherwise are dissimilar from each other. For example, the subtitles or audio components of the media presentation might be mined or processed to capture dialogue that is indicative of the large context.

Referring back to FIG. 4, the entity event data are then processed for each context to identify any uneventful intervals (410). According to a particular implementation, this involves generating a list of the events for a given context arranged according to the timeline timestamp to which each event corresponds. The list is parsed sequentially to identify events that relate to new entities, removing those that are redundant of an event for the same entity earlier in the interval. Referring again to the example of FIG. 1, the event data representing the identification of actor C at 1:25:30 registers as relating to a new entity for scene two as there previously were no events corresponding to actor C. However, the 19 events for actor C that follow that event can be removed as redundant.

This process may involve the use of confidence scores associated with each event. For example, if the confidence score associated with the event for actor C at 1:25:30 is low (e.g., because actor C is only partially in the frame), it might still register as an event for a new entity, but a subsequent event for actor C (e.g., at 1:25:31) might have a higher confidence score (e.g., because actor C is now fully in the frame) and so still be retained as not being redundant of the first event. Similarly, a low confidence event for a particular entity that follows a high confidence event for that same entity might not be removed as it is possible that it corresponds to a new entity. Other variations on this theme will be understood by those of skill in the art.

Once the redundant events have been removed from a context, contiguous time intervals within the context that do not include retained events are identified as uneventful intervals. This information may then be provided for use with, for example, a media annotation tool as a way to enable the operator using the tool to skip over or fast forward through ranges of the content that are not relevant to the types of entities for which the operator is creating metadata.

According to some implementations, additional constraints might be placed on the identification of uneventful intervals. For example, if an interval is identified that does not include any events, but that is short in duration (e.g., less than 10 seconds) it might not be identified as an uneventful interval for the purpose of media annotation. Alternatively, this constraint might be imposed by the software or tool that makes use of the information about uneventful intervals.

It should also be noted that, just as the identification of events for different types of entities may be done in separate work flows, the identification of uneventful intervals may also be done separately for different types of entities. This might be useful, for example, to support distinct annotation work flows in which operators are looking for events corresponding to only one type of entity. Such an approach might be useful in that if, for example, an operator is only looking for the first appearance of each actor in each scene, the duration of content that can be skipped will be significantly larger than if that same operator is looking for several different types of entities. And this also likely to be true for the operators that are each looking for a different entity type in the same title. Nevertheless, implementations are contemplated in which the uneventful intervals are determined with reference to all relevant entity types.

Figure 5:
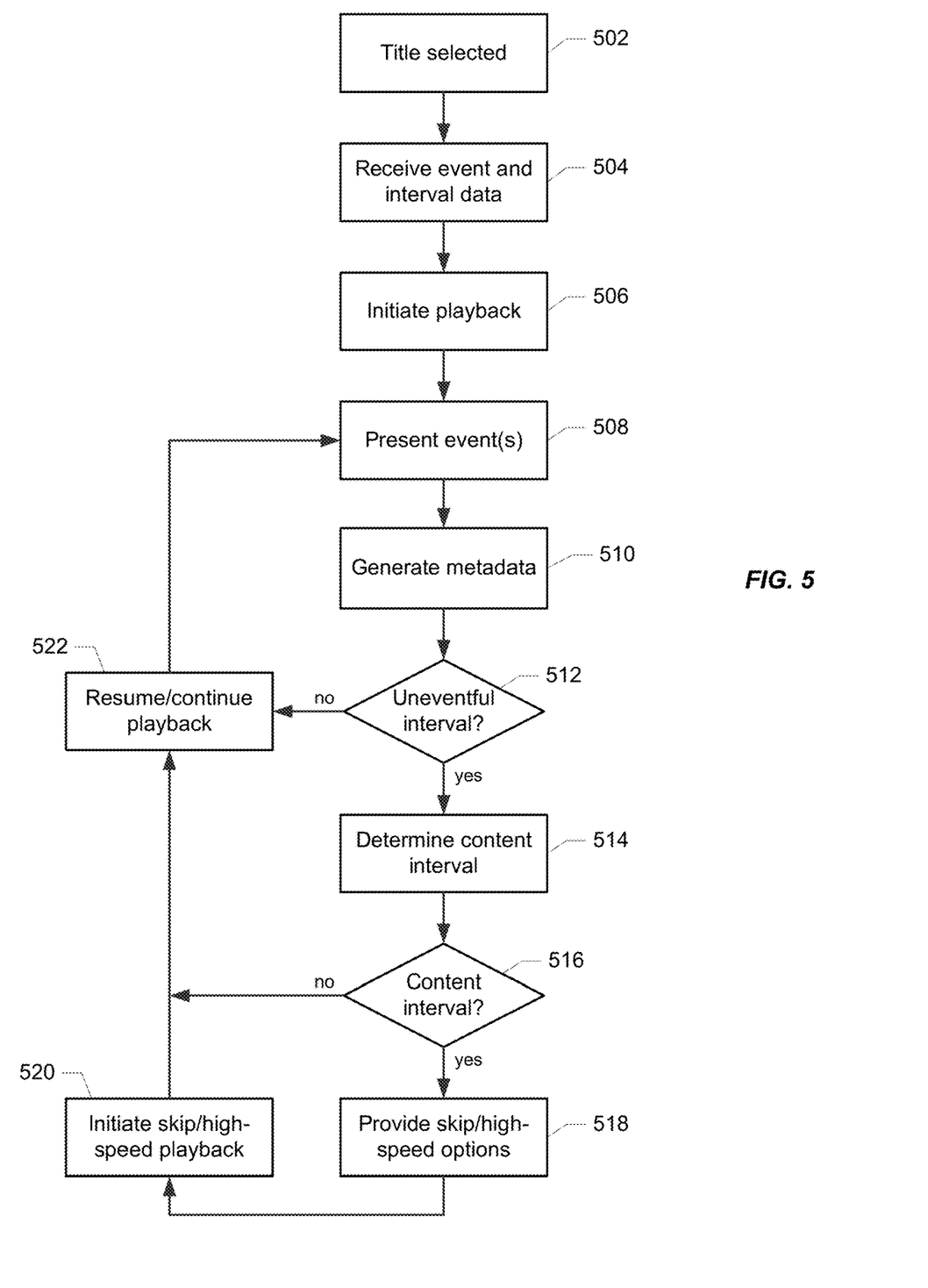
FIG. 5 is a flowchart illustrating operation of another class of implementations enabled by the present disclosure.

As mentioned above, the identification of uneventful intervals may be used to enhance the efficiency with which a media presentation may be annotated, e.g., for the purpose of generating interactive metadata such as Prime Video's X-Ray metadata. A particular approach to achieving this is illustrated in the flowchart of FIG. 5. The operator selects a media presentation to be annotated in the interface of a media annotation tool (502). In response to this selection, the media annotation tool receives or retrieves data representing previously determined entity events and uneventful intervals for the selected title (504) (e.g., determined as described with reference to FIG. 4), and the media player on the operator's device begins playback of the selected title (506).

As playback proceeds, retained entity events are surfaced to the operator in the tool interface (508), and the operator generates metadata using the tool (510). This may involve insertion of annotations for recognized entities and/or confirmation or correction of the automatically generated entity events. The operator might, for example, make use of information about the title (e.g., from the iMDB database) to validate, create, update, or supplement metadata for each of the entity events.

As playback approaches a point in the media timeline of the title near an uneventful interval (512), an interval of the content (e.g., for skipping or high-speed playback) is determined based on the uneventful interval (514). As mentioned above, this content interval might not correspond exactly to the uneventful interval in that it might be desirable for the operator to see at least some of the content that is included in the uneventful period. The content interval might already have been determined as part of the work flow in which the uneventful intervals are identified (e.g., see FIG. 4). And for implementations in which all uneventful periods are provided to the media annotation tool regardless of duration, the determination of the content interval might also include a filtering step in which, if the duration of the uneventful interval is below a threshold (e.g., 10 seconds), then no content interval is determined, or its value is set to zero.

Assuming that a content interval is determined (516), one or more options relating to the content interval may be surfaced to the operator in the interface of the media annotation tool (518). For example, the interface might include a link or control that allows the operator to initiate skipping or high-speed playback (e.g., 6× or 8×) of the content interval (520). In some implementations, skipping might be enabled where the confidence associated with the content interval (i.e., highly unlikely to include relevant events) is sufficiently high (e.g., >90%), and high-speed playback enabled if the confidence associated with the interval is not as high (e.g., >70% but <90%). In some implementations, the skipping or high-speed playback might be automatically initiated by annotation tool. This might be done as playback reaches the beginning of the content interval, or in response to an expected action taken by the operator (e.g., verification of a particular entity event).

After completion of the skipping or high-speed playback of the content interval, playback of the content resumes (522), with the process iterating until annotation of the title is complete or the operator terminates the session. Using this approach, the attention of the operator is focused on the portions of the media presentation in which meaningful events occur, while dramatically increasing throughput. More generally, the identification of uneventful intervals as enabled by the present disclosure may be employed in any context in which human intervention is required to verify machine-generated output relating to an interval in any kind of media presentation.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    processing video frames of a media presentation using facial recognition to identify actors of a cast of the media presentation;
    generating actor event data based on the processing of the video frames, the actor event data representing a plurality of actor events represented in the media presentation, each actor event corresponding to appearance of a corresponding one of the actors in the media presentation, the actor event data including a time stamp for each actor event relative to a media timeline of the media presentation;

generating histograms for at least some of the video frames of the media presentation, each histogram representing visual characteristics of the corresponding video frame;

identifying a plurality of visually similar intervals of the media presentation based on the histograms;

identifying a sequence of the visually similar intervals based on the histograms, the sequence of the visually similar intervals including first and second visually similar intervals having a high degree of similarity separated by a third visually similar interval having a low degree of similarity with the first and second visually similar intervals, the sequence representing a context within the media presentation;

identifying a range of the media presentation relative to the media timeline based on the actor event data and the sequence of the visually similar intervals, the range of the media presentation representing a portion of the media presentation in which appearance of an additional one of the actors is unlikely; and presenting the range of the media presentation in a media annotation user interface.

2. The method of claim 1, wherein identifying the visually similar intervals includes determining correlations for pairs of the histograms based on the Bhattacharyya distance (BD) for the pairs of the histograms.

3. The method of claim 1, wherein identifying the sequence of the visually similar intervals includes determining that a first histogram representing a video frame near an end of the first visually similar interval has a high degree of similarity with a second histogram representing a video frame near a beginning of the second visually similar interval.

4. The method of claim 1, further comprising presenting one or both of a first option and a second option in the media annotation interface, the first option enabling an operator to skip at least part of the portion of the media presentation, the second option enabling the operator to initiate high-speed playback of at least part of the portion of the media presentation.

5. A computer-implemented method, comprising:
receiving entity event data for a media presentation, the entity event data representing a plurality of entity events represented in the media presentation, each entity event corresponding to appearance of a corresponding entity in the media presentation, the entity event data including a time stamp for each entity event relative to a media timeline of the media presentation;
identifying a plurality of visually similar intervals of the media presentation; and
identifying a range of the media presentation relative to the media timeline based on the entity event data and one or more of the visually similar intervals, the range of the media presentation representing a portion of the media presentation in which occurrence of unidentified entity events is unlikely.

6. The method of claim 5, wherein the entity event data represent one or more of appearance of an actor, appearance of an object, or playback of an audio file.

7. The method of claim 5, wherein one or more of the visually similar intervals corresponds to a context within the media presentation, and wherein the range of the media presentation is identified based on a time interval between consecutive entity events occurring within the context that relate to different entities.

8. The method of claim 5, wherein identifying the visually similar intervals includes:
generating histograms for at least some video frames of the media presentation, each histogram representing visual characteristics of the corresponding video frame; and
determining correlations for pairs of the histograms.

9. The method of claim 8, wherein the correlations for the pairs of the histograms are based on the Bhattacharyya distance (BD) for the pairs of the histograms.

10. The method of claim 5, further comprising identifying a sequence of the visually similar intervals, the sequence representing a context within the media presentation, wherein identifying the range of the media presentation is also based on the sequence of the visually similar intervals.

11. The method of claim 10, wherein the sequence of the visually similar intervals includes first and second visually similar intervals having a high degree of similarity separated by a third visually similar interval having a low degree of similarity with the first and second visually similar intervals, and wherein identifying the sequence of the visually similar intervals includes determining that a first histogram representing a video frame near an end of the first visually similar interval has a high degree of similarity with a second histogram representing a video frame near a beginning of the second visually similar interval.

12. The method of claim 5, further comprising enabling skipping of at least part of the portion of the media presentation, or enabling high-speed playback of at least part of the portion of the media presentation.

13. A system, comprising one or more computing devices configured to:
receive entity event data for a media presentation, the entity event data representing a plurality of entity events represented in the media presentation, each entity event corresponding to appearance of a corresponding entity in the media presentation, the entity event data including a time stamp for each entity event relative to a media timeline of the media presentation;
identify a plurality of visually similar intervals of the media presentation; and
identify a range of the media presentation relative to the media timeline based on the entity event data and one or more of the visually similar intervals, the range of the media presentation representing a portion of the media presentation in which occurrence of unidentified entity events is unlikely.

14. The system of claim 13, wherein the entity event data represent one or more of appearance of an actor, appearance of an object, or playback of an audio file.

15. The system of claim 13, wherein one or more of the visually similar intervals corresponds to a context within the media presentation, and wherein the one or more computing devices are configured to identify the range of the media presentation based on a time interval between consecutive entity events occurring within the context that relate to different entities.

16. The system of claim 13, wherein the one or more computing devices are configured to identify the visually similar intervals by:
generating histograms for at least some video frames of the media presentation, each histogram representing visual characteristics of the corresponding video frame; and determining correlations for pairs of the histograms.

17. The system of claim 16, wherein the correlations for the pairs of the histograms are based on the Bhattacharyya distance (BD) for the pairs of the histograms.

18. The system of claim 13, wherein the one or more computing devices are further configured to identify a sequence of the visually similar intervals, the sequence representing a context within the media presentation, and wherein the one or more computing devices are configured to identify the range of the media presentation based on the sequence of the visually similar intervals.

19. The system of claim 18, wherein the sequence of the visually similar intervals includes first and second visually similar intervals having a high degree of similarity separated by a third visually similar interval having a low degree of similarity with the first and second visually similar intervals, and wherein the one or more computing devices are configured to identify the sequence of the visually similar intervals by determining that a first histogram representing a video frame near an end of the first visually similar interval has a high degree of similarity with a second histogram representing a video frame near a beginning of the second visually similar interval.

20. The system of claim 13, wherein the one or more computing devices are further configured to enable skipping of at least part of the portion of the media presentation, or enable high-speed playback of at least part of the portion of the media presentation.

* * * * *